INVENTOR
ANTONY PROUDMAN
BY James E. Murray
ATTORNEY

March 10, 1970 A. PROUDMAN 3,500,341
BISTABLE MONOLITHIC STORAGE MATRIX WITH NONRESTRICTIVE
READOUT PERFORMING LOGICAL OPERATIONS
Filed Feb. 27, 1967 3 Sheets-Sheet 3

United States Patent Office 3,500,341

Patented Mar. 10, 1970

3,500,341

BISTABLE MONOLITHIC STORAGE MATRIX WITH NONRESTRICTIVE READOUT PERFORMING LOGICAL OPERATIONS

Antony Proudman, Winchester, England, assignor to International Business Machines Corporation, Armonk, N.Y., a corporation of New York

Filed Feb. 27, 1967, Ser. No. 618,673

Int. Cl. G11c *7/00, 5/02, 19/00*

U.S. Cl. 340—173 3 Claims

ABSTRACT OF THE DISCLOSURE

This specification describes transistor storage cells for use in monolithic memories that perform storage, associative storage and/or logical functions. These cells each comprise a pair of transistors which are coupled together to form a bistable circuit. One of the transistors connects an input line of the memory to an output line of the memory. When this transistor is conducting it permits a pulse to pass through it from the input line to the output line. The other transistor is also connected to the input line but has one of its electrodes connected to a source of reference potential so that when it is in its conductive state a pulse on the input line will not be permitted to pass to the output line.

Background of the invention

This invention relates to data storage cells and apparatus utilizing such cells.

In the early days of computers, bistable trigger circuits were used as storage cells in random access stores. Now the bulk of random access stores use ferrite cores because they are cheaper and require considerably less space. However, these advantages of ferrite cores over bistable trigger circuits are being overcome with the development of monolithic circuit techniques which enable the batch fabrication of the trigger circuits in prewired memory arrays. One problem in fabricating these memory arrays has been that the number of imperfect arrays produced is very high or, in other words, the production yield of operative arrays is low. This of course has an unfavorable effect on the economics of array manufacture and it is therefore quite important that the production yield of operative arrays be increased. A way of doing this is to reduce the number of components and interconnections in each storage element while at the same time increase the allowable tolerances imposed on the components. Such a reduction in components and interconnections not only has the advantage that there are fewer objects that can fail but it also allows the interconnections between the cells to be shortened. This results in a corresponding reduction in the adverse effects due to interline capacitance and line resistance that usually are present in monolithic arrays.

Therefore, it is an object of the present invention to provide storage cells that can be fabricated into monolithic memory arrays.

A further object of this invention is to provide a monolithic storage cell with few parts and interconnections.

Another object of this invention is to reduce the effects of interline capacitance and resistance on the operation of monolithic storage cells.

Another object of this invention is to help keep noise on the bit sense lines to a minimum.

Other objects of this invention are to increase the manufacturing yield of operative memory arrays; provide new monolithic memories; provide memories which are capable of performing logical functions; and provide memory cells with high component tolerances.

Summary

In accordance with the present invention storage cells are provided which comprise a pair of transistors coupled together to form a bistable circuit. One of the transistors connects an input line to an output line so that when this transistor is in its conductive state, a pulse is permitted to pass through it from the input to the output line. The other transistor is connected to receive such a pulse from the input line but has one of its electrodes connected to a source of reference potential so that when it is in its conductive state, the pulse does not pass to the output line.

Another aspect of the present invention is the adaptation of monolithic memories to perform logical functions by controlling the voltages and currents on the addressing wires of the array.

Description of the drawings

The foregoing and other objects, features and advantages of the invention will be apparent from the following more particular description of preferred embodiments of the invention, as illustrated in the accompanying drawings, of which

Description of preferred embodiments

Figure 1:
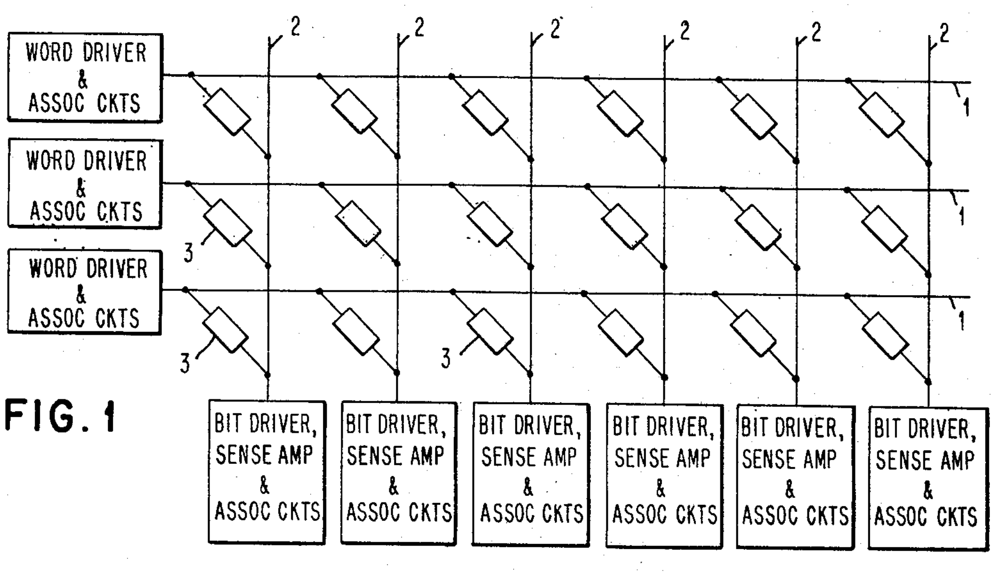
FIGURE 1 shows schematically a portion of a memory array.

FIGURE 1 shows schematically a portion of an information store of the type for which the invention is most suitable. An actual store would probably have a capacity sufficient for the storage of many thousands of words each probably being in the region of seventy bits in length. In the figure, three word lines 1 are shown crossing six bit/sense lines 2. A storage cell 3, which in this invention is a bistable circuit, is shown connecting a word line 1 to a particular bit/sense line 2 in the region of each cross-over point. Thus in this particular figure a matrix of eighteen storage elements is shown.

A word is written into the matrix by selecting the appropriate word line 1 and applying signals to the bit/sense lines 2 necessary to get the associated bistable circuits into the required information significant states. The matrix is interrogated by energizing the appropriate word line whereupon signals appear on the bit/sense lines 2 that are indicative of the information stored by the cell 3 associated with that word line.

First embodiment of the cells

Figure 2:
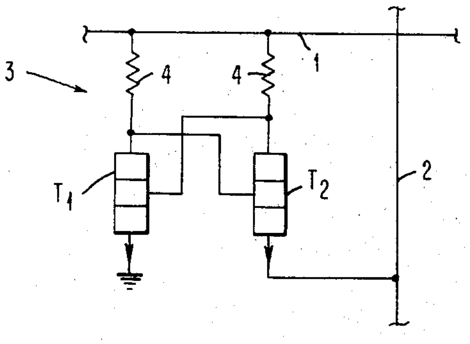
FIGURE 2 shows a data storage cell of the present invention.

FIGURE 2 shows a single storage cell of an information store such as described with reference to FIGURE 1. The storage cell is shown generally by the reference numeral 3 and is seen to consist of two directly-coupled transistors $T_1$ and $T_2$. The collectors of the two transistors are connected through equal resistors 4 (typical value 1000Ω) to word line 1. The emitter of $T_1$ is maintained at ground potential while the emitter of $T_2$ is connected to the bit/sense line 2.

In operation, the word lines 1 of a matrix of these storage cells 3 are normally maintained at a positive potential of about 1 volt while the bit/sense line is at ground potential. With the word and bit lines so maintained, the cell is in its information storing state with either transistor $T_1$ or $T_2$ conducting and the other nonconducting. In the remainder of the application we will refer to a cell with transistor $T_1$ conducting as storing a binary ZERO and a cell with transistor $T_2$ conducting as storing a binary ONE. However, it should be understood that if desirable the nomenclature can be revised.

Information is written into the storage cell by applying a small positive or negative WRITE voltage to the associated bit/sense line 2, and at the same time, lowering the potential of the word line 1 to ground. The word line 1 is then maintained at ground potential for a period long enough for any transistor that was on to turn off. The word line is thereafter raised to its normal potential and, depending upon the sense of the WRITE voltage of the bit/sense line 2, the transistor whose emitter is the most negative will turn on. Therefore, since the emitter of transistor $T_1$ is always at ground potential a small positive voltage on the bit/sense line 2 will cause transistor $T_1$ to conduct, recording a binary ZERO, and a small negative voltage will cause transistor $T_2$ to conduct recording a binary ONE. Clearly, the WRITE signal applied to the bit/sense line 2 must be maintained until the potential of the word line 1 is restored to its normal value of 1 volt. The various voltages required to WRITE information are shown in FIGURE 3*a*.

To read the information stored in the cell, the storage cell is interrogated by applying a positive interrogate pulse to the word line 1 as shown in FIGURE 3*b*. If a ZERO is stored in the cell 3, transistor $T_1$ is conducting and transistor $T_2$ is off. In this state no current will flow to the bit/sense line 2. This is because the collector of $T_2$ is grounded through the base of $T_1$, preventing the transmission of signals through $T_2$. If a ONE is stored in the storage element, transistor $T_2$ is conducting and transistor $T_1$ is off. Therefore, the collector resistor of $T_2$ is coupled to the bit/sense line 2 and the INTERROGATE signal is therefore transmitted to the bit/sense line 2. It should be apparent that the information state of the cell will not be effected by the interrogation. That is to say the conducting transistor will remain conducting and the nonconducting transistor will remain nonconducting after the information is read from the memory. Therefore the cell operates in a nondestructive read-out mode of operation.

Disturb sensitivity

The sensitivity of the cell to bit/sense line disturb voltage depends on the difference between the collector saturation voltage $V_{CE}$ sat. of the on transistor and the base voltage at which the other transistor starts to conduct. Typical transistors are available with $V_{CE}=0.1$ volt at $I_C=I_B=1$ ma. and with $V_{BE}=0.5$ volt at $I_C=\frac{1}{2}$ ma. With such a transistor the element can withstand bit disturb voltages of ±0.4 volt.

Write sensitivity

The bit/sense line potential to ensure writing equals the tolerance between $V_{BE}$ characteristics of the two transistors in each element. It is possible to hold these within ±.05 volt. Thus disturb sensitivity is not a problem, and in fact there is a margin in hand for the relaxation of the transistor specifications.

Output capacity

The output capacity seen by the bit/sense line is equal to $C_{BE}$ at $V_{BE}=0$ for either state of the element.

Component tolerances

An important feature of the cell is the wide tolerances allowable on the components. The tolerances on the ratio of the values of the collector resistors 4, is equal to the transistors' current gain. The tolerance on the absolute value of resistors 4 contributes to variation in the amplitude of the ONE signal. The inherently good signal to noise ratio of the element implies that wide variations in the value of resistors 4 can be accepted.

The main requirements of the transistor are high switching speed and low output capacities. The low current gain needed should allow for optimization in both these respects.

Power dissipation

With resistor 4=1K and the word line potential at +1 volt the element dissipation is approximately 1 mw. For slower speed applications, the collector resistance can be increased so as to reduce the element dissipation.

Alternative embodiments of the cells

Two alternative data storage cells operating in the same principle will now be described in connection with FIGURES 4 and 5.

Figure 4:
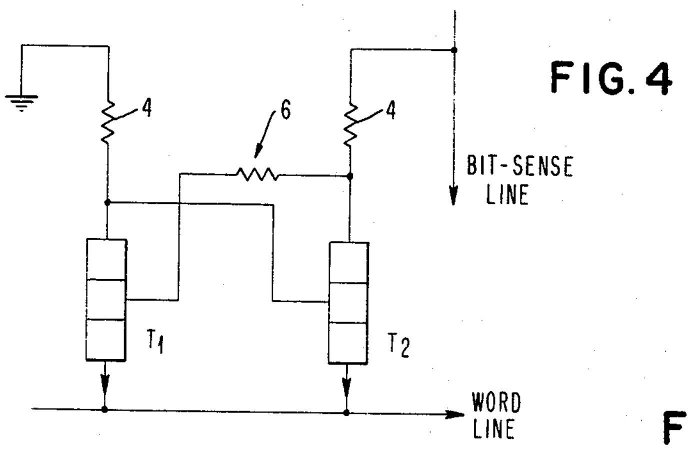
FIGURE 4 shows an alternative form of the data storage element of the present invention.

In the alternative shown in FIGURE 4, the bit/sense line is connected through a load resistor 4 to the collector of transistor $T_2$ rather than directly to the emitter of transistor $T_2$. Also the word line is connected directly to the emitters of transistors $T_1$ and $T_2$ rather than to the collectors of those transistors through load resistors 4. In addition a resistor 6 is placed between the base of transistor $T_1$ and the collector of transistor $T_2$. It may be possible to reduce the capacity of loading on the bit/sense line by this arrangement.

To write with this first alternative configuration, the word line potential, which is usually at some negative value, is raised to ground to cut off transistors $T_1$ and $T_2$. A small positive or negative voltage is then applied to the bit/sense line according to whether a binary ZERO or ONE is to be recorded. The word line is then lowered to its normal potential and depending upon the sense of the voltage of the bit/sense line the transistor with its base the most positive is turned on.

The information is read out of the cell shown in FIGURE 4 by pulsing the word line negatively with respect to its usual value. If transistor $T_2$ is conducting this pulse will be transmitted through transistor $T_2$ to the bit/sense line. If $T_1$ is conducting it will hold $T_2$ off and prevent the pulse from being transmitted to the bit/sense line. Resistor 6 is larger than resistor 4 to prevent a coupling of the signal to the bit line through the base to emitter connection of $T_1$.

Figures 5, 6:
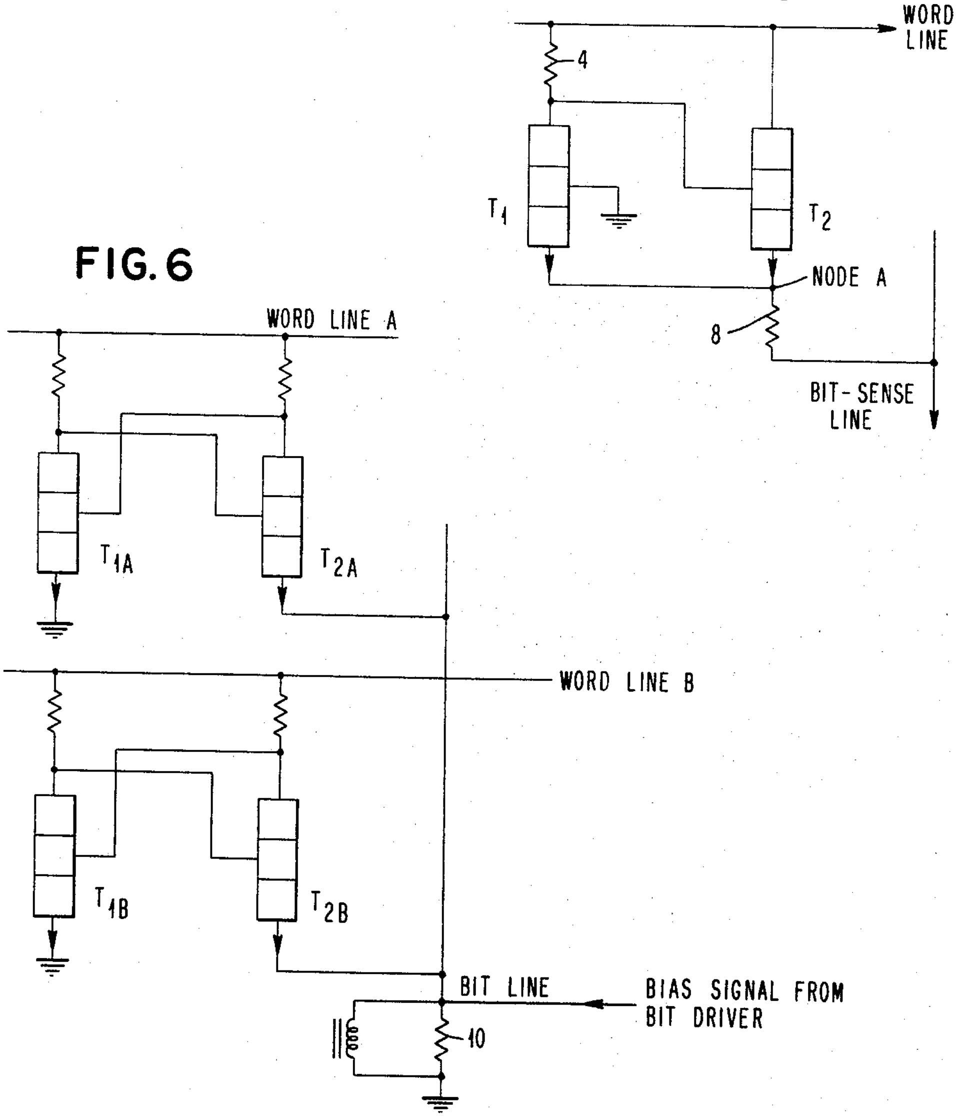
FIGURE 5 shows another alternative data storage element of the present invention.
FIGURE 6 shows a portion of a modified matrix of data storage elements.

The second of the described alternatives is shown in FIGURE 5. Here the emitters of $T_1$ and $T_2$ are coupled through a common resistor 8 to the bit sense line while the collectors of $T_1$ and $T_2$ are connected to the word line. The collector of $T_1$ is connected to the word line through collector resistor 4 and the collector of $T_2$ is directly connected to the word line. The base of $T_2$ is connected to the collector of $T_1$ and the base of $T_1$ is connected to ground. This configuration has a good signal to noise ratio and the bit/sense line is buffered by the resistor 8.

Prior to writing information into this cell, the word line, which is normally at some positive potential, is lowered to ground potential while the bit line is maintained at ground potential. To then write a binary ZERO, transistor $T_1$ is conditioned to conduct by providing a negative potential on the bit/sense line. If instead, a binary ONE is to be written the word line is raised above its normal standing potential and the bit/sense potential is lowered so as to switch on transistor $T_2$.

To read information stored in the cell, the word line is pulsed positive as described in connection with the first embodiment. If $T_2$ is conducting, this results in an output signal on the bit/sense line. However if $T_1$ is conducting there is no resultant signal because node A is fixed to ground through the base to emitter junction of $T_1$.

Other uses for monolithic matrices

The storage elements have so far been described for use in a storage matrix. The element shown in FIGURE 2 is also capable of performing certain logical operations within the storage array shown in FIGURE 6. In FIGURE 6, A and B are any two words in the store. Each operation causes the result of the logical operation to be placed in the address of B and leaves A unchanged. In order to perform these operations the store must be equipped with two sets of address decoders, so that both the addresses A and B may be specified. It is also necessary to modify the drive voltages, but the element itself and the array interconnections are unchanged.

As shall be seen later, the cell may also be used in an associative store.

Write the complement of A into B, $\bar{A}\rightarrow B$

Figure 7:
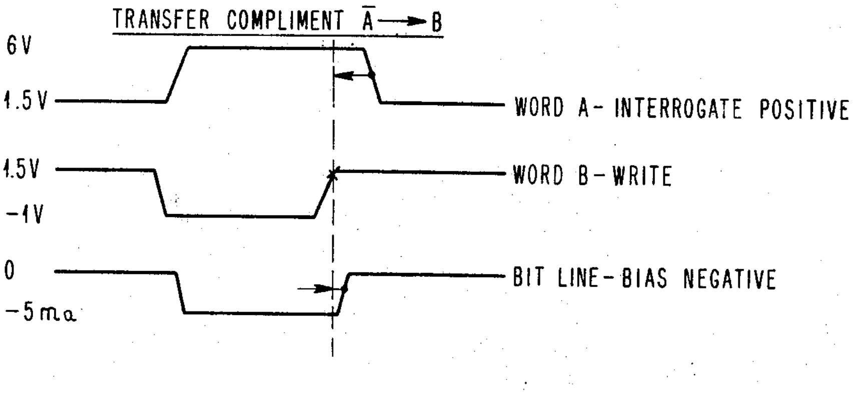
FIGURE 7 shows wave forms used to perform a logical transfer in the matrix shown in FIGURE 6.

One logical operation that can be performed is to write the complement of the information stored in word A in word B. FIGURE 7 shows the current and voltage pulses necessary to do this. As shown, a positive interrogate signal is applied to word line A and a negative bias current pulse is applied to the bit line from the bit driver. The bias pulse is equal to approximately half the interrogate signal in amplitude. In addition, line B is taken to ground potential or below, and is returned to its quiescent potential before the sense and bias signals are removed. If transistor $T_{2A}$ is conducting the bit line will be driven positive by the positive signal on the word line A. Therefore, when word line B is returned to its quiescent level $T_{1B}$ will be rendered conductive. Alternatively, if $T_{1A}$ is conducting the bit line will be negative due to the negative bias on the bit line. Thus when the word line B is returned to its quiescent level $T_{2B}$ will be rendered conductive.

Write A into B, $A\rightarrow B$

A second operation that can be performed is to transfer the information stored in word line A into word line B. To do this the signals shown in FIGURE 7 are changed by making the interrogating pulses on word line B negative with respect to the quiescent potential on the bit line. This requires the quiescent word line potential be increased to allow for this negative interrogation. Of course this increases dissipation. If the increased dissipation is unacceptable this facility could be provided for on a few words only.

AND the complement of A with B and write the result in B, $(A\cdot\bar{B})\rightarrow B$ Another logical function that can be performed is to AND the complement of the information in word A, with the information in word B and place the result in word B.

Figure 8:
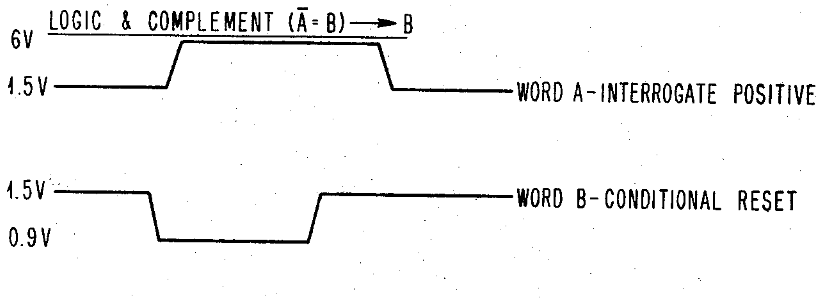
FIGURE 8 shows the wave forms used to perform a logical operation in the matrix shown in FIGURE 6.
Figure 9:
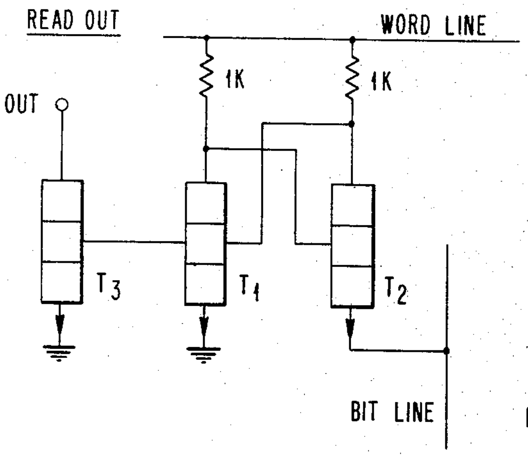
FIGURE 9 shows a data storage element modified so as to permit reading the information stored in the cell from an external device.

The sensitivity of the cell to positive disturb signals applied to the emitter of $T_2$ increases in a controlled manner as the word line potential is reduced. With the normal word line potential of +1.5 volts and with $T_2$ conducting, the disturb potential is determined by the point at which $T_2$ is unable to hold off $T_1$. But, if the word line potential is reduced to, say, +0.9 volt, then the disturb potential is determined by the point at which $T_2$ is unable to remain on because of a reduction of its base current. Therefore, the operation $\bar{A}\cdot B\rightarrow B$ can be carried out by interrogating A with a positive waveform of 5 volts amplitude and by applying a conditional reset signal of 0.9 volt to word line B while no bias current is supplied to the bit line. This is illustrated in FIGURE 8. If $T_{2A}$ is conducting, the bit line will be driven positive by the interrogate pulse. This will render $T_{2B}$ nonconductive if it is then conducting, and when word line B is returned to its operating level, will provide the positive bias to switch $T_{1B}$ on. If $T_{1A}$ is conducting the bit line will not be driven positive. Therefore, $T_{2B}$, if it is conducting, will remain conducting after the interrogate and conditional reset pulses end. If $T_{1B}$ is conducting the pulsing will not turn it off irrespective of whether $T_{1A}$ of $T_{2A}$ is conducting.

AND the information in A and B and place the result in $B(A\cdot B)\rightarrow B$ A final logical function that can be performed is to AND the information in word lines A and B and place the result in word line B.

In this case word A is interrogated by reducing the operating voltage on the word line and applying a positive bias to the bit line. Otherwise, the operation is similar to the performance of the last discussed function.

Associative storage function

Signals applied to a bit line will reach a word line if transistor $T_2$ in the corresponding element is conducting. In this way, it is possible to interrogate the bit lines with, say, positive 0.25 volt signals and detect mismatches with sense amplifiers on each of the word lines.

So far it has been shown that certain internal operations can be carried out within the monolithic store. However, these operations are purely parallel, that is, bit 1 of word A is combined with bit 1 of word B, bit 2 of word A is combined with bit 2 of word B and so on. In order to perform "horizontal" operations such as shifting and carry propagate, it is necessary to add external function generators such as shift registers and adders. It is therefore desirable to associate various function generators with specific storage addresses.

Figure 3:
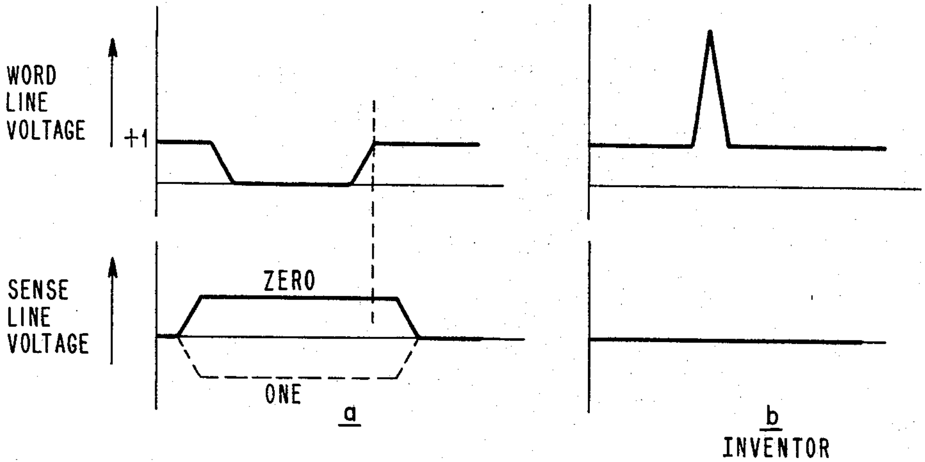
FIGURE 3*a* shows the wave forms for writing information into the data storage cell shown in FIGURE 2.
FIGURE 3*b* shows the wave form used to interrogate the data storage cell shown in FIGURE 2.

This concept can be extended to provide a store without sense amplifiers or data registers. Instead a number of addresses can be distributed through the array and through these addresses the array can communicate the logical units, data buses, address positions in other stores and possibly even its own decoder. The data storage elements at these addresses have to be suitably modified so that they can communicate with external devices. Specifically, the data storage element shown in FIGURE 2 can be modified to be read out externally to another store by connecting a third transistor $T_3$ in the direct coupled configuration across $T_1$ as shown in FIGURE 3. The output from $T_3$ is D.C. and is not affected by internal transfers which may be occurring between other words in the array.

Figure 10:
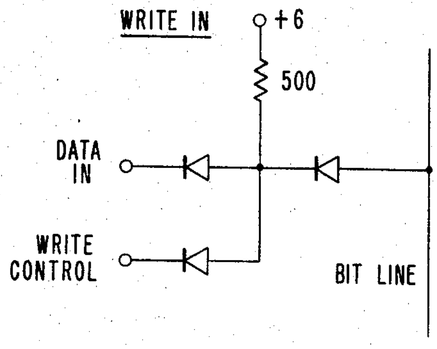
FIGURE 10 shows one method of writing into a data storage element from an external device.

FIGURE 10 shows a diode gate for writing into the store from an external device by modification of the bit line bias. Clearly it is possible to write into any address position with this arrangement.

While the invention has been particularly shown and described with reference to preferred embodiments thereof, it will be understood by those skilled in the art that various changes in form and details may be made therein without departing from the spirit and scope of the invention.

What is claimed is:

1. In a data storage system having two word lines, a plurality of bit lines and bistable monolithic memory cells coupling the two word lines to each of the bit lines, the improvement which comprises:

(a) means associated with one word line interrogating said one word line and providing outputs on the bit lines;

(b) means associated with the other word line for setting the states of the monolithic memory cells coupling said other word line to the bit lines; and (c) means associated with the bit lines for biasing said bit lines so that said outputs on said bit lines from said one word line set the state of the monolithic memory cells associated with said other word line.

2. The data storage system of claim 1 wherein the setting of the states of the monolithic cells associated with said other word line is dependent on the present state of the monolithic cells associated with said other word line.

3. The data storage system of claim 1 wherein the setting of the states of the monolithic cells associated with said other word line is independent of the present state of the monolithic cells associated with said other word line.

References Cited

UNITED STATES PATENTS 3,295,031 12/1966 Schmitz.

TERRELL W. FEARS, Primary Examiner

HOWARD L. BERNSTEIN, Assistant Examiner

U.S. Cl. X.R.

307—221, 238